US012693202B2

(12) United States Patent
Millán García et al.

(10) Patent No.: US 12,693,202 B2
(45) Date of Patent: Jul. 28, 2026

(54) TEST APPARATUS FOR THE DYNAMIC MEASUREMENT OF MOISTURE TRANSPORT AND STORAGE PROPERTIES OF POROUS MATERIALS

(71) Applicant: UNIVERSIDAD DEL PAÍS VASCO / EUSKAL HERRIKO UNIBERTSITATEA, Leioa (ES)

(72) Inventors: José Antonio Millán García, Leioa (ES); Alexander Martín Garín, Leioa (ES)

(73) Assignee: UNIVERSIDAD DEL PAIS VASCO / EUSKAL HERRIKO UNIBERTSITATEA, Leioa (ES)

(*) Notice: Subject to any disclaimer, the term of this patent is extended or adjusted under 35 U.S.C. 154(b) by 300 days.

(21) Appl. No.: 18/702,155

(22) PCT Filed: Oct. 14, 2022

(86) PCT No.: PCT/ES2022/070648
§ 371 (c)(1),
(2) Date: Apr. 17, 2024

(87) PCT Pub. No.: WO2023/067213
PCT Pub. Date: Apr. 27, 2023

(65) Prior Publication Data
US 2026/0118246 A1 Apr. 30, 2026

(30) Foreign Application Priority Data
Oct. 19, 2021 (ES) ................................. ES202130977

(51) Int. Cl.
*G01N 15/08* (2006.01)
(52) U.S. Cl.
CPC ................................. *G01N 15/0806* (2013.01)

(58) Field of Classification Search
CPC ........ G01N 15/00; G01N 5/045; G01N 15/08; G01N 15/0806; G01N 33/0011;
(Continued)

(56) References Cited

U.S. PATENT DOCUMENTS

2016/0216186 A1* 7/2016 Wu ........................... B01L 1/00

FOREIGN PATENT DOCUMENTS

CN 103512641 B 2/2016
SU 400840 A1 10/1973

OTHER PUBLICATIONS

International Search Report for International Application No. PCT/ES2022/070648, dated Mar. 14, 2023, 3 pages.
(Continued)

*Primary Examiner* — John E Breene
*Assistant Examiner* — Truong D Phan
(74) *Attorney, Agent, or Firm* — CANTOR COLBURN LLP

(57) ABSTRACT

A test apparatus comprising including a housing with an interior forming a watertight main measuring chamber for housing a bar, a framework structure supporting the housing, a sample holder in the main chamber, and an air-conditioning system. The apparatus includes a humidifying system, a thermal regulation system, and a humidified air recirculation system. The sample holder has two lower support elements for supporting two end parts of the sample bar, respectively, corresponding to the unsealed end face of the sample bar. Two suspension arms are each hinged at its lower end to one of the lower support elements, the first arm hinged to an upper part of the framework structure, and the second arm hinged to be connected to a force gauge in the main chamber, the support elements suspended on the suspension arms to keep the sample bar axially suspended in a horizontal plane without causing axial stresses in the bar.

10 Claims, 5 Drawing Sheets

(58) Field of Classification Search
CPC .... G01N 1/28; G01N 33/0016; G01N 24/081;
G01N 2030/525; G01N 2030/528; G01N
2223/649; G01N 30/50; G01N 30/54;
G01N 2201/023; G01N 2201/0238; G01N
21/81; G01N 27/048; G01N 2035/00455;
G01N 2291/02845
USPC ............. 73/38, 866, 865.6, 865.9, 866.5, 73
See application file for complete search history.

(56) References Cited

OTHER PUBLICATIONS

Written Opinion for International Application No. PCT/ES2022/
070648, dated Mar. 14, 2023, 5 pages.

* cited by examiner

TEST APPARATUS FOR THE DYNAMIC MEASUREMENT OF MOISTURE TRANSPORT AND STORAGE PROPERTIES OF POROUS MATERIALS

CROSS-REFERENCE TO RELATED APPLICATIONS

This application is a 35 U.S.C. § 371 National Stage patent application of PCT/ES2022/070648, filed on 14 Oct. 2022, which claims the benefit of Spanish patent application P202130977, filed on 19 Oct. 2021, the disclosures of which are incorporated herein by reference in their entirety.

TECHNICAL FIELD

The present disclosure is comprised in the technical field of test systems for porous materials for determining the moisture transport and storage properties of porous materials, and particularly monolithic porous building materials.

BACKGROUND

Moisture plays a fundamental role in the aesthetic and/or functional deterioration of porous building materials. In the indoor environment of buildings, excess moisture in the enclosures may cause pathologies related to the development of microorganisms, moulds, and fungi, which are also responsible for respiratory diseases. Moisture problems may arise due to surface or interstitial condensation, rainwater seepage into the building envelope, increased humidity, or leakages in water supply and drainage systems, in addition to catastrophic weather events. The causes of most of these problems can be related to improper design or maintenance. Moreover, the main source of moisture in the material which causes biodeterioration in the indoor environment is water vapour, and mostly in the case of homes and offices, moisture generated by normal household activities of the occupants and/or by the occupants themselves.

A thorough understanding of combined heat and moisture transport is required to address problems relating to material durability and health. In particular, moisture transport at low moisture content in the hygroscopic regime is of interest for biodeterioration problems, for example, fungal growth. Although fungal deterioration of finish materials is often related to surface condensation, experimental evidence shows that virtually all indoor fungi grow optimally in relative humidities below saturation.

It is generally recognised that macroscopic moisture transport in monolithic porous materials can be described using a non-linear diffusion equation. In such models, all the mechanisms for moisture transport, i.e., liquid flow and vapour diffusion with associated improvement mechanisms, are assimilated into a single moisture diffusivity which depends on the actual moisture content. The basic equations for combined heat and moisture transfer were first established by PHILIP, J. R. and D. A. DE VRIES (1957), *Moisture Movement in Porous Materials under Temperature Gradients*, Trans. Amer. Geophys. Union 38: 222-232. During the last decades, the work of WITHAKER, S. (1977), *Simultaneous heat, mass and momentum transfer in porous media. A theory of drying porous media*, Adv. Heat Transfer 13: 119-200, and BEAR, J. and Y. BACHMAT (1990), *Introduction to modeling of transport phenomena in porous media*, Vol. 4, Kluwer, Dordrecht, provided the structures for understanding its fundamental equations. PEL, L., A. A. J. KETELAARS, O. C. G. ADA N and A. A. VAN WELL (1993), *Determination of moisture diffusivity in porous media using scanning neutron radiography*, Int. J. Heat Mass Transfer 36:1261-1267, show a general compilation of the method.

The material is subjected to drying, absorption, and transient relative humidities. In the response of the material to transient relative humidities in the hygroscopic range, the actual diffusivity resulting from the measurements is based on apparent diffusivity, estimated on the basis of hygroscopic sorption.

It is generally recognised that water transport in porous building materials can be described using a macroscopic diffusion equation. The determination of the diffusion and coefficients of this equation poses a significant problem as it has "non-linear" characteristics. There is no testing technique which provides the value of the coefficients over the entire useful spectrum, so testing times are extremely long, and therefore costly. Moreover, in order to be statistically representative, the testing requires a large number of samples which are generally rendered unusable as a result of the destructive techniques, greatly hindering interlaboratory contrast or reproducibility.

For the dynamic determination of moisture diffusivity, non-destructive measurement techniques based on neutron beam attenuation and nuclear magnetic resonance have been applied to determine moisture diffusivity isothermally, directly from transient moisture content profiles. These techniques require the use of sophisticated and expensive test equipment as described by CARMELIET J. et al. (1993), *Determination of the Liquid Water Diffusivity from Transient Moisture Transfer Experiments*, Journal of THERMAL ENV. & BLDG. SCI, Vol. 27, No. 4 1097-1963/04/04 0277-29 DOI: 10.1177/1097196304042324.

The moisture diffusivity that will be used in modelling mass transfer in buildings and building materials is highly dependent on the initial conditions of the material, which underlines the complex interaction of liquid and vapour phases in the porous system. Accordingly, the experimental results refute common estimates of hygroscopicity effects based on apparent diffusivity values with sorption isotherm and water vapour permeability.

When the equilibrium moisture content of a porous material at a specific relative humidity is expressed with respect to the capillary pressure corresponding to said relative humidity, the moisture retention curve is obtained. Most of the porous materials used in construction have a wide range of pore radii of between 10-5 and 10-12 m. As a result, the moisture retention curve is highly non-linear.

Said retention curve can be divided into two parts corresponding to two mass storage regimes:

a hygroscopic regime an over-hygroscopic regime

In the hygroscopic regime, monolayer and subsequently multilayer adsorption occurs in the walls of the pores, followed by capillary condensation in the pores. Transition from hygroscopic to over-hygroscopic regime occurs when the moisture content is equal to the critical content. At that time, transition from water vapour flow to dominant flow of water in liquid state occurs.

In turn, the over-hygroscopic regime is divided into two areas:

a capillary regime an over-capillary regime

The capillary area is that corresponding to the moisture content between critical moisture and capillary saturation moisture. The over-capillary area is between the capillary saturation moisture content and the vacuum saturated moisture content. Under normal conditions, porous building materials generally perform their function in the hygroscopic and capillary regimes. The over-capillary regime is important in materials the service life of which starts under full saturation conditions such as cement mortars and concretes.

The moisture retention curve is subjected to hysteresis between drying and wetting processes. The drying of a completely saturated material is described by means of the "drying curve", whereas the wetting of an initially dry material is described by means of the "wetting curve". In building physics, the capillary moisture content defines the upper limit of the wetting curve, this moisture content being less than the vacuum or total saturation moisture content, due to the air trapped in the pores.

Based on the foregoing, it can be deduced that the mechanisms for moisture transport and storage in porous building materials are a complex phenomenon aggravated by the presence of phase change and the combined transmission of water in vapour state and in liquid state.

This complexity means that there is no single test method that can adequately characterise all the transfer segments from dry material to material filled with moisture in liquid state. In addition, the test conditions are valid for an isothermal state, and in order to represent the actual operating conditions in buildings, it is necessary to characterise the property at different temperatures, taking into account the combined effect of heat and moisture transport simultaneously.

PENG RENA et al. (2019), *Hygric properties of porous building materials (V): Comparison of different methods to determine moisture diffusivity*, Building and Environment 164 106344, analyse different methods for obtaining moisture diffusivity obtained by different methods during the capillary absorption process for different porous building materials, reaching the following conclusions:

a) The X-ray attenuation method is reliable for determining the w-A profile and moisture diffusivity. However, it requires expensive facilities, special experimental skills, and complicated data processing, which hinder its standardisation and popularisation;

b) The rule method generally provides results close to the X-ray attenuation method, but it is simpler; however, it can only be used in the capillary range for materials with a visible and clear water front;

c) The multi-step method is easy to experiment with, but complicated in terms of data processing. Whether the concatenation of several steps is sufficiently accurate to represent moisture diffusivity is open to debate;

d) The Kießl-Künzel method is the simplest of all, but it is not always accurate.

These methods only comply with the liquid capillary regime test.

The study of these different and complex theories of moisture transport in porous media is an indication as to why one of the oldest industrial processes used by man is still so little understood today. Therefore, sophisticated equipment or techniques having drawbacks as they are difficult to apply in conventional or routine/regulatory material testing are required.

SUMMARY

One or more of the problems of the state of the art are solved with the present test apparatus. Test apparatus for the dynamic measurement of moisture transport and storage properties of porous materials, comprising a housing, a framework structure, a sample holder, and an air-conditioning system.

The housing is supported by the framework structure and has an interior which forms a watertight main measuring chamber for housing a sample bar having a constant section and having faces sealed in a watertight manner, with all of the faces thereof being sealed except for one of its end faces. The sample holder is arranged in the main chamber.

The air-conditioning system serves for obtaining regulated relative humidity and temperature conditions for the air inside the main chamber which comprises a humidifying system, a thermal regulation system, an air recirculation system, and a control system.

The humidifying system has the function of humidifying air inside the main chamber so as to obtain humidified air inside the main chamber, the thermal regulation system is intended for establishing the predetermined working temperatures of the humidified air inside the main chamber so as to obtain thermally conditioned humidified air, whereas the humidified air recirculation system provides for recirculation of thermally conditioned humidified air inside the main chamber. The control system controls the humidifying, thermal regulation, and air recirculation systems so as to establish a plurality of combinations of the regulated relative humidity and temperature conditions. The control system can be programmed in a computer operating on the basis of PID (proportional, integral, and derivative)-based software.

In the test apparatus according to the disclosure, the sample holder comprises first lower support elements for supporting a first end part of the sample bar and second lower support elements for supporting a second end part of the sample bar corresponding to the unsealed end face of the sample bar;

a first suspension arm and a second suspension arm each hinged at its lower end to one of the lower support elements.

The first suspension arm is hinged to an upper part of the framework structure, and the second suspension arm being hinged such that it is connected to a force gauge (dynamometer) arranged in the main chamber, and the lower support elements are suspended on the suspension arms such that they keep the sample bar axially suspended in a horizontal plane without causing axial stresses in the bar.

The first suspension arm is hinged, by means of a first upper hinge, to an upper part of the framework structure, whereas the second suspension arm is hinged, by means of a second upper hinge, to a force gauge arranged in an upper part of the main chamber. The second suspension arm is attached to the second lower support element by means of a second lower hinge.

The mechanical coupling for off-centre force measurement on a bar-type sample, is able to determine by means of transient the mass variation that occurs when moisture is absorbed through only one of the ends of the sample, on which the recording of weight takes place, under regulated conditions in the main air-conditioning chamber at controlled humidity and temperature values.

The suspension arms that transmit the off-centre force are designed such that the axial component in the sample bar is cancelled out completely, so as not to introduce parasitic stresses caused by possible expansion of the sample bar as a result humidity- or thermal-related reasons. Preferably the suspension arms, hinges, and support elements form an adjustable trapezium geometric system to adapt to the dimensions of the sample.

Preferably, the weight variation detected by the force gauge is transferred to a calculation program of the control system which is capable of obtaining the instantaneous slope (differential) on a graph of evolution of the off-centre mass. The software programmed in the control system, also by means of a communication protocol, is designed to determine whether the humidity and temperature conditions in the main chamber are stable, and can change the air-conditioning of the chamber to a new measurement point.

At least one of the support elements can be in the form of a bracket with a support base for the sample bar. Preferably, the support elements are symmetrical.

The thermal regulation system may comprise a thermoresistor probe with a negative temperature coefficient for measuring the temperature in the main chamber and for transmitting signals identifying the measured temperature to the control system, and a Peltier effect thermoelectric system for regulating the temperature in the main chamber so as to establish the predetermined working temperatures of the humidified air inside the main chamber in response to temperatures measured in the main chamber. The temperature in the main chamber is also regulated by a Peltier effect thermoelectric system that provides the suitable temperature value and that therefore allows testing under isothermal conditions. The reference is compared to a thermoresistor probe with a negative temperature coefficient, NTC.

The humidifying system may comprise a capacitive-type humidity probe arranged in the main chamber for measuring the humidity of the humidified air inside the main chamber and for transmitting signals identifying the measured humidity to the control system, as well as first and second humidity balancing chambers. The first humidity balancing chamber comprises a lower tray containing a first hydrated salt solution, whereas the second humidity balancing chamber comprises a tray containing a second hydrated salt solution, each balancing chamber having at least one air inlet communicating with the main chamber and an air outlet communicating with the main chamber.

Preferably, the air outlets of the balancing chambers have respective shutter devices acting as outlet valves, such as elastic sheets, for examples.

The first hydrated salt solution is capable of releasing a constant value of humidity into the air in the first balancing chamber up to or from a temperature at or up to which the second hydrated salt solution is capable to releasing humidity into the air in the second balancing chamber. For example, the first hydrated salt solution may be a potassium sulphate $K_2SO_4$ solution which, at about 23° C., is capable of releasing relative humidity into the air in the first chamber at a constant value of 97.42%+0.47, and the second hydrated salt solution in the second balancing chamber may be a calcium chloride $CaCl_2$) solution which releases 0% relative humidity at about 23° C. In this way, it is possible to provide relative humidities to the air passing through the balancing chambers and recirculated to the main chamber within a wide temperature range.

The humidified air recirculation system may comprise a first axial fan for causing the air originating from the main chamber to pass from the air inlet through the first balancing chamber and discharging the air into the main chamber through the air outlet, and a second axial fan for causing the air originating from the main chamber to pass from the air inlet through the second balancing chamber and discharging the air into the main chamber through the air outlet. In this case, the control system regulates the flow rate of the air caused by each fan to pass through each of the balancing chambers based on the air humidity measured by the humidity probe by controlling the speed of each fan.

The desired values in the main chamber are obtained by regulating the rotational speed of the respective axial fans which renew the humidity balancing chambers by recirculating the air in the main chamber.

The combination of air blown through both chambers necessarily balances the different relative humidity values. Regulation is performed based on the measurement of the capacitive-type humidity probe and the PID (proportional, integral, and derivative)-based control system generates the humidity conditions in the measuring chamber. The control system can be implemented, for example, under the free ARDUINO NANO software and hardware protocol. To prevent air currents inside the chamber caused by the fans, the fans are stopped during the weighing recording time.

The information flows between the physical system for measuring the values of humidity, temperature, and force measured by the weight gauge, and the test control software, which obtains communication, for example, through a PC serial port of the computer in which the control software of the control system is implemented.

By means of the test device, diffusivity measurements Dw (diffusion coefficient of moisture) can be obtained by applying the theory of diffusion to a bar-shaped sample with a constant section in which relative imbalances are created in its moisture content, and by means of off-centre gravimetric methods the diffusion coefficient corresponding to the following formula can be deduced $$g = -Dw - \partial w / \partial x$$

wherein g=total moisture transport flow, corresponding to the liquid and vapour phase kg/(s·m²)

Dw=Moisture diffusivity in m²/s

∂w/∂x is the partial derivative of the moisture content (w in [kghum/kg]) in each section of the sample with respect to a reference distance from the support point (x in [m]), it can be identified by means of off-centre weighing in suspension.

The method can be automated to enable obtaining, without the intervention of the measurement operator, all the diffusion values in both the vapour phase and the liquid phase, for which regulation of the temperature and humidity in the chamber is required. For temperature, a conventional PID system can be used, but for relative humidity values, a novel system formed by chambers with stratified forced ventilation in charge of regulating the humidity of the main measuring chamber has been devised.

The use of the gravimetric measurement mechanism in suspension allows cancelling out the axial stresses that would be generated between localised or sliding supports of the sample, and eliminates hysteresis which can be attributed to the measurement system.

The system also allows the simultaneous control of temperature (preferably by forced Peltier system) and humidity in the test so as to allow obtaining a balance and the necessary scaling in a small climatic chamber.

The sample bar with a constant section (material sample) is preconditioned to a specified moisture content value and sealed on all its faces except for one of the ends of the bar (the one which is supported on the weight measurement system) and the other end is supported on a fixed hinged point. At this point, the recording is started in the off-centre measurement mechanism and the curve of mass variation over time is obtained (in which the climatic chamber has been kept at a constant humidity and temperature value, ensuring that weight recordings are not influenced by air turbulence inside the chamber and that the measurement is accurate).

The variation of each weighing step is related to the moisture flow in the conditions considered as stationary equilibrium, obtaining for that condition the value sought by means of the differentiation of a curve established with the following formulas:

$$\alpha \nabla^2 T + \frac{L}{\rho_s c'}\left\{ K_v\left[(a-M)\nabla^2 \rho_v - \nabla M \rho_l\right] - (a-M)\frac{\partial \rho_v}{\partial l} + \rho_v \frac{\partial M}{\partial l}\right\} = \frac{\partial T}{\partial l}$$

$$K_l \rho_l \nabla^2 M + K_v\left[(a-M)\nabla^2 M \rho_v - \nabla M \nabla \rho_v\right] = (\rho_l - \rho_v)\frac{\partial M}{\partial t} + (a-M)\frac{\partial \rho_v}{\partial l}$$

M Moisture content [kg moisture/kg dry solids]
t Time [s]
T Temperature [° C. or K]
KI Liquid diffusion coefficient [m²/s]
JI Liquid flow [kg/m²/s]
KH Permeability [m³/m]
Kv Vapour diffusion coefficient [m²/s]
Mv Vapour concentration in pores [kg vap/kg dry]
k Dry solid thermal conductivity coefficient [W/m K]
keff Effective thermal conductivity [W/m K]
L Latent heat of evaporation [J/kg]
Cm Isothermal capacity of moisture [kg moisture/kg dry or M]
c' Specific heat of the wet body [J/kg K]
U Moisture potential [dimensionless]
D' Diffusion coefficient as a function of moisture potential [m²/s]
p Pressure [N/m²]
g Acceleration of gravity [m/s²]
DPM Global moisture transport coefficient [m²/s]
DPI Liquid transport coefficient [m²/s]
Dbl Effective bound liquid diffusion coefficient [m²/s]
Dva Effective vapour air diffusion coefficient [m²/s]
Dpg Gas transport coefficient [m²/s]
ml Liquid generation [kg/m³ s]
mb Bound moisture generation [kg/m³ s]
hs Adsorption heat [J/kg]
s Energy generation [W/m³]
Cpg Specific heat of gas [J/kg K]
Cpl Specific heat of liquid [J/kg K]
a Coefficient of thermal diffusivity as a function of moisture potential [m²/s]
$\rho_v$ Vapour density [kg/m³]
$\rho$ Liquid density [kg/m³]
In accordance with what has been described above, the test apparatus according to the present disclosure has the following advantages:

since the apparatus is compact, the dimensions of the sample are small.

since the apparatus requires samples having a low volume, the test time is reduced.

the apparatus allows isothermal continuous dynamic testing without external intervention.

the apparatus is suitable for testing over the entire range of moisture use, from saturation to dry sample in hygroscopic and over-hygroscopic capillary regimes.

BRIEF DESCRIPTION OF THE DRAWINGS

To complement the description and for the purpose of aiding to better understand the features of the disclosure according to practical embodiments thereof, a set of drawings is attached as an integral part of the description in which the following has been depicted in an illustrative and non-limiting character.

DETAILED DESCRIPTION OF THE DRAWINGS

Figure 1:
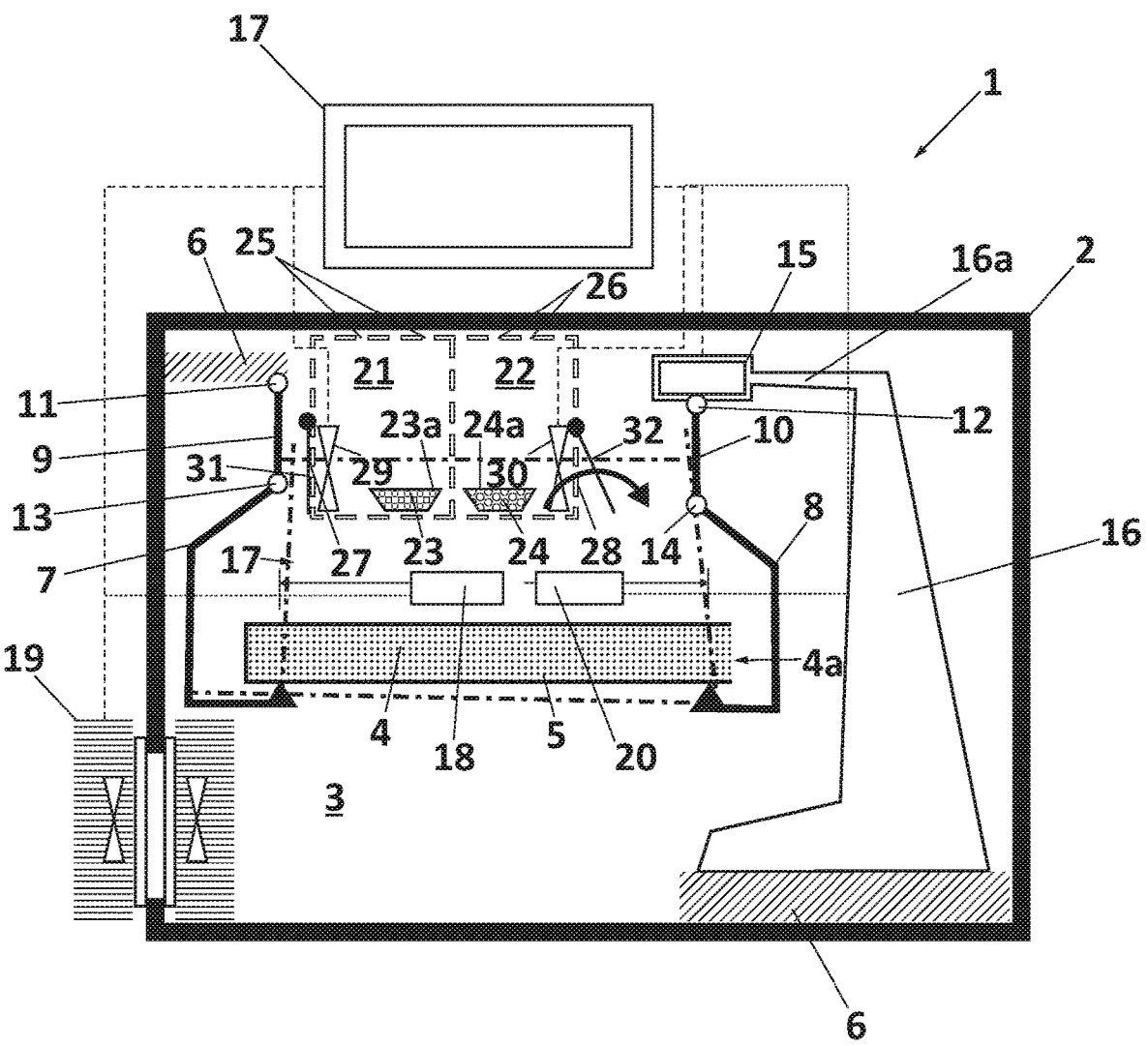
FIG. 1 is a schematic view of an embodiment of the test apparatus according to the disclosure.

FIG. 1 shows a test apparatus -1- for the dynamic measurement of moisture transport and storage properties of porous materials, comprising a housing -2- with an interior which forms a watertight main measuring chamber -3- for housing a sample bar -4- having a constant cross-section and having faces sealed in a watertight manner, with all its faces being sealed except for one -4a- of its end faces. The sample bar has a constant circular, square, or rectangular section with a length L of ±0.5 mm.

The test apparatus further comprises a framework structure -6- supporting the housing -2-, a sample holder arranged in the main chamber -3-, and an air-conditioning system for obtaining regulated relative humidity and temperature conditions for the air inside the main chamber -3-.

The humidifying system comprises a humidifying system for humidifying the air inside the main chamber -3- so as to obtain humidified air inside the main chamber -3-, a thermal regulation system for establishing the predetermined working temperatures of the humidified air inside the main chamber -3- so as to obtain thermally conditioned humidified air, a humidified air recirculation system for providing a recirculation of thermally conditioned humidified air inside the main chamber -3-, and a control system -17- controlling the humidifying, thermal regulation, and air recirculation systems so as to establish a plurality of combinations of regulated relative humidity and temperature conditions.

Figure 2:
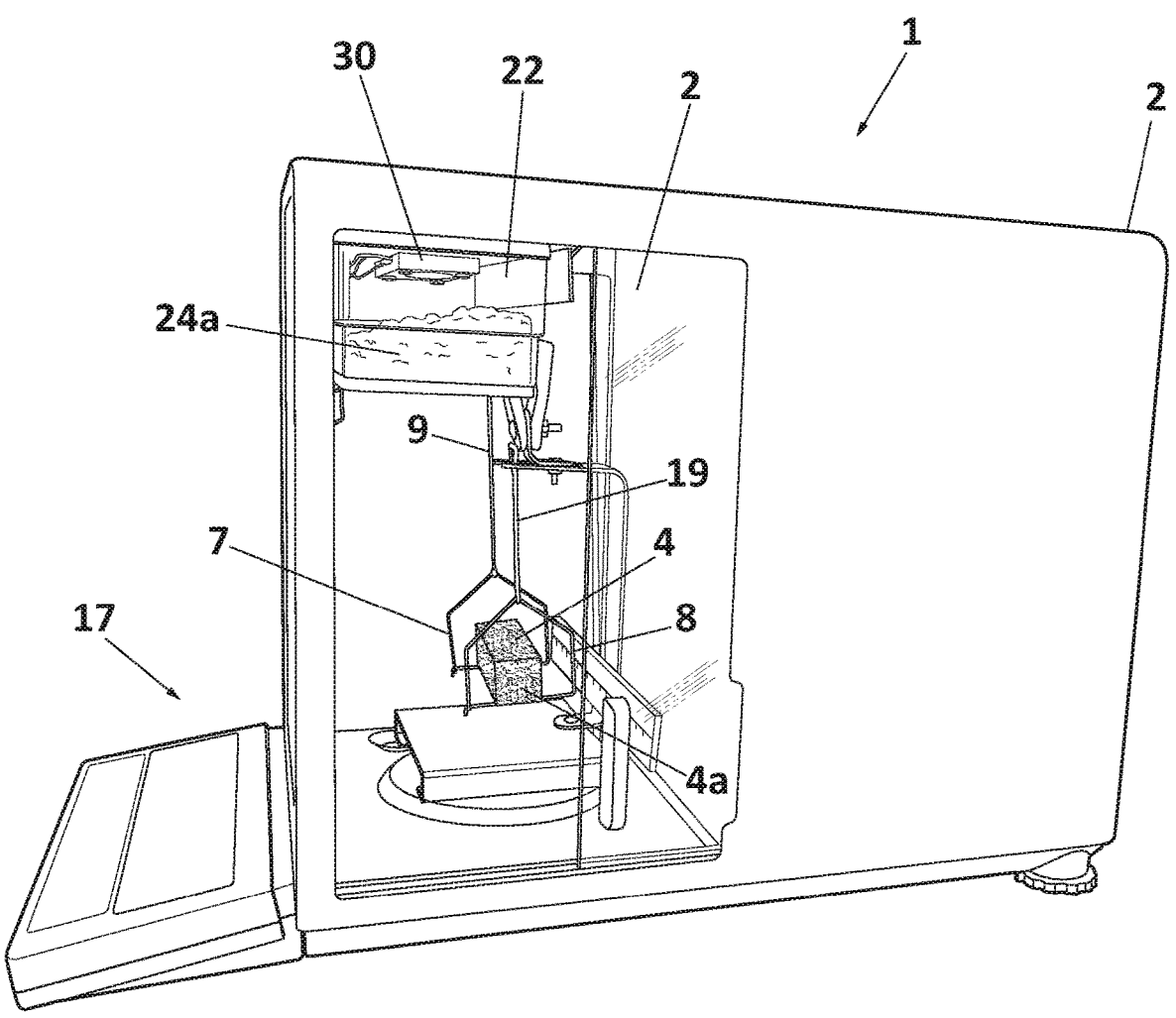
FIG. 2 is a side view showing in more detail the features of a practical embodiment of the test apparatus according to the disclosure.
Figure 3:
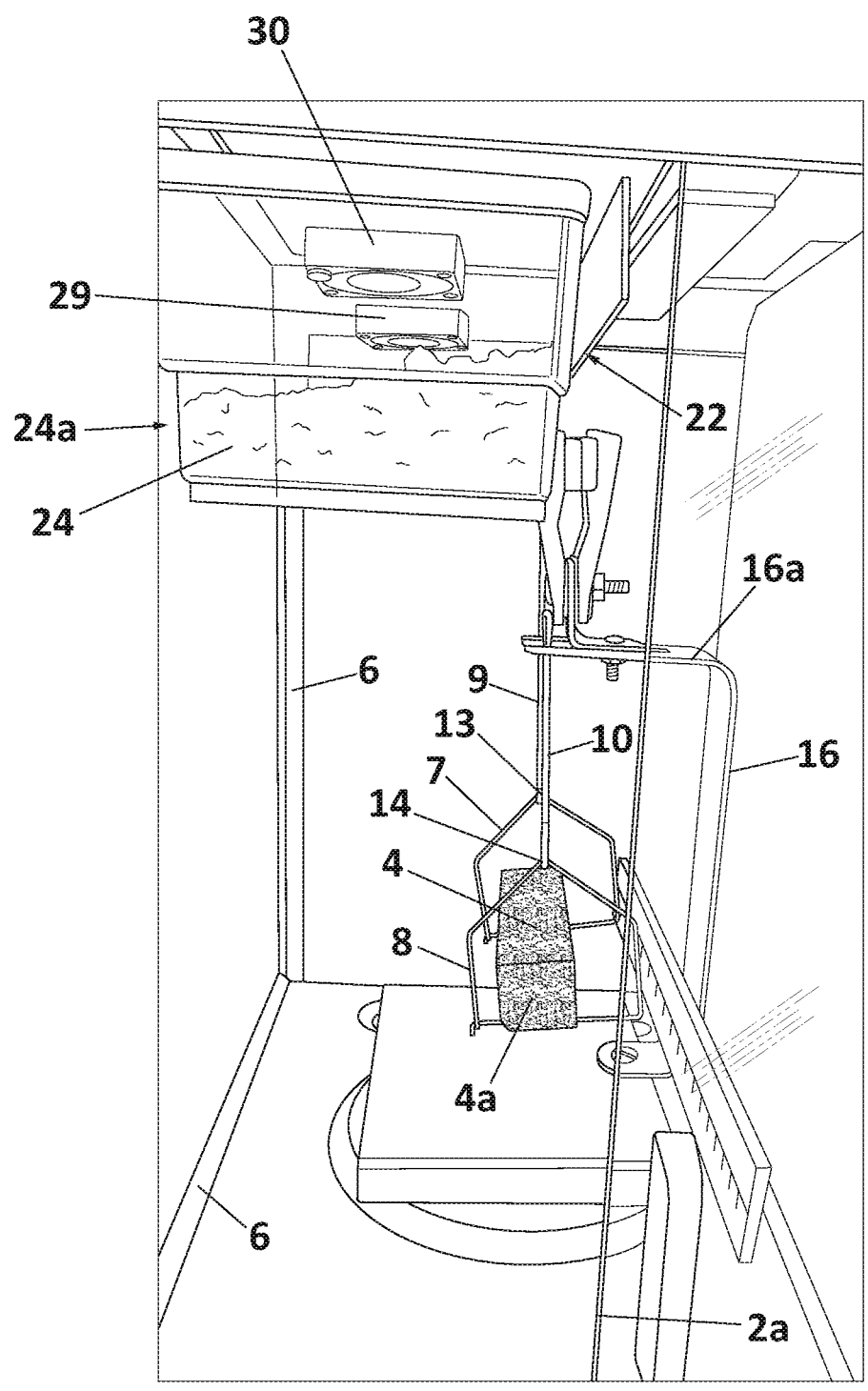
FIG. 3 is a partial side view of the test apparatus shown in FIG. 2.
Figure 4:
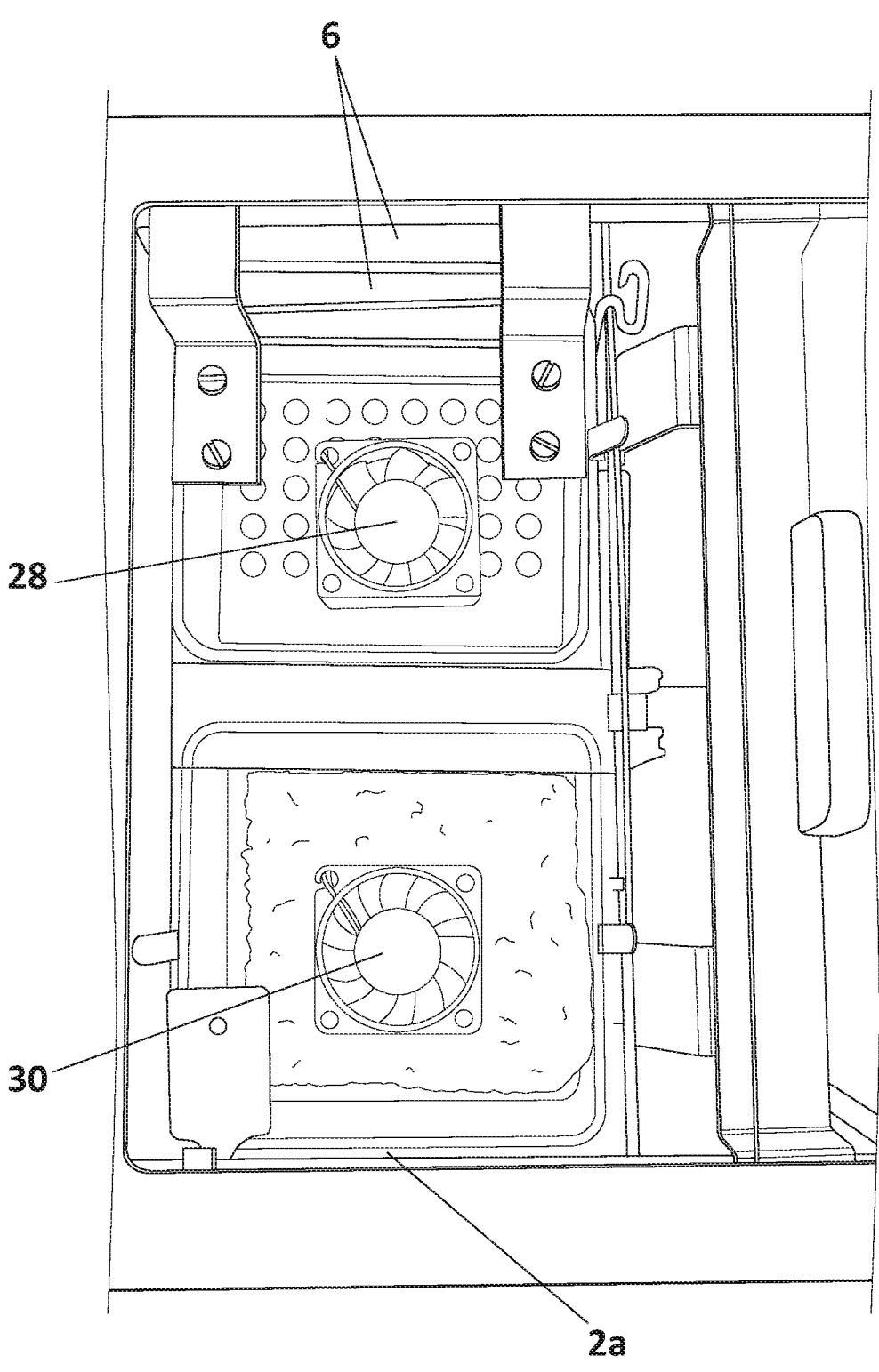
FIG. 4 is a top plan view of the test apparatus shown in FIG. 2.
Figure 5:
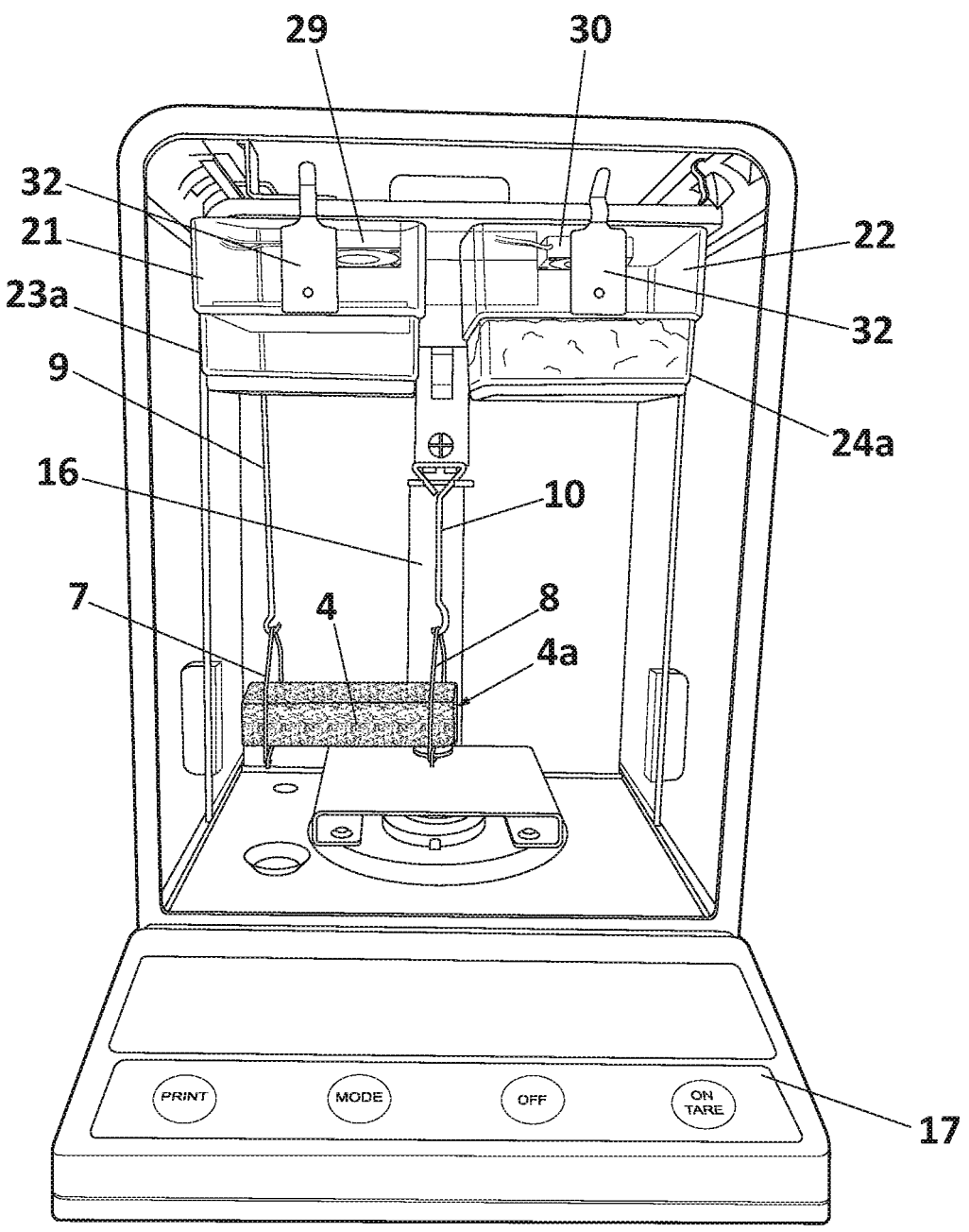
FIG. 5 is a front elevational view of the test apparatus shown in FIG. 2.

The sample holder comprises first lower support elements -7- for supporting a first end part of the sample bar -4- and second lower support elements -8- for supporting a second end part of the sample bar -4- corresponding to the unsealed end face -4a- of the sample bar -4-, as well as a first suspension arm and a second suspension arm -9,10-, each hinged at its lower end to one the lower support elements -7, 8-. The support elements -7, 8- are symmetrical and in the form of a bracket with respective support bases for the sample bar -4- in the embodiment illustrated in FIGS. 2 to 5, as can be seen particularly in FIGS. 2, 3, and 5.

The first suspension arm -9- is hinged to an upper part of the framework structure -6-, and the second suspension arm -10- is hinged to a force gauge -15- arranged in an upper part of the main chamber -3-, such that the lower support elements -7, 8- are suspended on the suspension arms -9, 10- such that they keep the sample bar -4- axially suspended in a horizontal plane without causing axial stresses in the bar -4-.

The first suspension arm -9- is hinged, by means of a first upper hinge -11-, to an upper part of the framework structure -6-, and by means of a first lower hinge -13-, to the lower support element -7-, whereas the second suspension arm -10- is hinged, by means of a second upper hinge -12-, to a force gauge -14- arranged in an upper part of the main chamber -3-. The second suspension arm -10- is attached to the second lower support element -8- by means of a second lower hinge -14-. The force gauge -15- is immobilised on a side extension -16a- of a frame -16- fixed to the bottom of the framework structure -6-. In this way, the suspension arms -9, 10-, the hinges -11, 12, 13, 14-, and the support elements -7, 8- form an adjustable trapezium geometric system -33- shown with dash-dotted lines in FIG. 1.

The thermal regulation system is integrated in the main control system and comprises a thermoresistor probe -18- with a negative temperature coefficient for measuring the temperature in the main chamber -3- and for transmitting signals identifying the measured temperature to the control system -17-, as well as a Peltier effect thermoelectric system -19- for regulating the temperature in the main chamber -3- so as to establish the predetermined working temperatures of the humidified air inside the main chamber -3- in response to temperatures measured in the main chamber -3-.

In turn, the humidifying system comprises a humidity probe -20- for the humidified air inside the main chamber -3- and for transmitting signals identifying the measured humidity to the control system -17-, as well as a first humidity balancing chamber -21- comprising a tray -23a- containing a first hydrated salt solution -23- and a second humidity balancing chamber -22- comprising a tray -24a- containing a second hydrated salt solution -24-, each balancing chamber -21, 22- having at least one air inlet -25, 26- communicating with the main chamber -3- and an air outlet -27, 28- communicating with the main chamber -3-.

The first hydrated salt solution -23- is capable of releasing relative humidity into the air in the first balancing chamber -3- up to or from a temperature at or from which the second hydrated salt solution -24- is capable of capturing humidity from the air in the second balancing chamber -3-.

As can be seen, the humidified air recirculation system comprises a first axial fan -29- for causing the air originating from the main chamber -3- to pass from the air inlet -25- through the first balancing chamber -21- and discharging the air into the main chamber -3- through the air outlet -28-, and a second axial fan -30- for causing the air originating from the main chamber -30- to pass from the air inlet -26- through the second balancing chamber -22 and discharging the air into the main chamber -3- through the air outlet -28-. The control system regulates the volume of air flow caused by each fan -29, 39- to pass through each of the balancing chambers -21, 22- based on the air humidity measured by the humidity probe -20- by controlling the speed of each fan -29, 29- and comprises software programmed in a computer operating on the basis of PID (proportional, integral, and derivative)-based software.

As can be seen in FIGS. 2 to 5, the front wall of the housing -2- demarcating the main chamber -3- comprises windows closed by a transparent material, whereas the other two side walls comprise the sliding windows -19- for access to the main chamber from any of the sides, and they are also made of a transparent material for external viewing.

In this text, the words first, second, third, etc. have been used to describe different devices or elements; it should be considered that the devices or elements are not limited by these words given that these words have only been used to distinguish one device or element from another. For example, the first device could have been referred to as the second device, and the second device could have been referred to as the first device without departing from the scope of the present disclosure.

In this text, the word "comprises" and its variants (such as "comprising", etc.) should not be understood in an exclusive sense, i.e., they do not exclude the possibility of that which is described including other elements, steps, etc.

Furthermore, the disclosure is not limited to the specific embodiments described herein, but rather encompasses the variations that one skilled in the art could make (e.g., in terms of choice of materials, dimensions, components, design, etc.), within the scope of what may be deduced from the claims.

The invention claimed is:

1. A test apparatus for the dynamic measurement of moisture transport and storage properties of porous materials, the test apparatus comprising:
   a housing with an interior which forms a watertight main measuring chamber for housing a sample bar having a constant section and having faces sealed in a watertight manner, with all its faces being sealed except for one of its end faces,
   a framework structure supporting the housing, a sample holder arranged in the main chamber,
   an air-conditioning system for obtaining regulated relative humidity and temperature conditions for the air inside the main chamber comprising:
   a humidifying system for humidifying the air inside the main chamber so as to obtain humidified air inside the main chamber,
   a thermal regulation system for establishing predetermined working temperatures of the humidified air inside the main chamber so as to obtain thermally conditioned humidified air,
   a humidified air recirculation system for providing a recirculation of thermally conditioned humidified air inside the main chamber, and
   a control system which controls the humidifying, thermal regulation, and air recirculation systems so as to establish a plurality of combinations of the regulated relative humidity and temperature conditions,
   wherein the sample holder comprises first lower support elements for supporting a first end part of the sample bar and second lower support elements for supporting a second end part of the sample bar corresponding to the unsealed end face of the sample bar; and
   a first suspension arm and a second suspension arm each hinged at its lower end to one of the lower support elements, the first suspension arm being hinged to an upper part of the framework structure, and the second suspension arm being hinged such that it is connected to a force gauge arranged in the main chamber, the lower support elements being suspended on the suspension arms such that they keep the sample bar axially suspended in a horizontal plane without causing axial stresses in the bar.

2. The test apparatus according to claim 1, wherein
   the first suspension arm is hinged, by means of a first upper hinge, to an upper part of the framework structure, and by means of a first lower hinge to the lower support element; and
   the second suspension arm is hinged, by means of a second upper hinge, to a force gauge arranged in an upper part of the main chamber, the second suspension arm being attached to the second lower support element by means of a second lower hinge.

3. The test apparatus according to claim 1, wherein the force gauge is immobilised on a side extension of a frame fixed to the bottom of the framework structure.

4. The test apparatus according to claim 3, wherein the suspension arms, the hinges, and the support elements form an adjustable trapezium geometric system to adapt to the dimensions of the sample.

5. The test apparatus according to claim 1, wherein at least one of the support elements is in the form of a bracket with a support base for the sample bar.

6. The test apparatus according to claim 1, wherein the support elements are symmetrical.

7. The test apparatus according to claim 1, wherein the thermal regulation system comprises:

a thermoresistor probe with a negative temperature coefficient for measuring the temperature in the main chamber and for transmitting signals identifying the measured temperature to the control system; and a Peltier effect thermoelectric system for regulating the temperature in the main chamber so as to establish the predetermined working temperatures of the humidified air inside the main chamber in response to temperatures measured in the main chamber.

8. The test apparatus according to claim 1, wherein the humidifying system comprises:

a humidity probe for the humidified air inside the main chamber and for transmitting signals identifying the measured humidity to the control system; and a first humidity balancing chamber comprising a tray containing a first hydrated salt solution and a second humidity balancing chamber comprising a tray containing a second hydrated salt solution, each balancing chamber having at least one air inlet-communicating with the main chamber and an air outlet communicating with the main chamber;

wherein the first hydrated salt solution is capable of releasing humidity into the air in the first balancing chamber up to or from a temperature at or from which the second hydrated salt solution is capable of releasing humidity into the air in the second balancing chamber.

9. The test apparatus according to claim 8, wherein the humidified air recirculation system comprises a first axial fan for causing the air originating from the main chamber to pass from the air inlet through the first balancing chamber and discharging the air into the main chamber through the air outlet, and a second axial fan for causing the air originating from the main chamber to pass from the air inlet through the second balancing chamber and discharging the air into the main chamber through the air outlet;

and in that the control system regulates the flow rate of the air caused by each fan to pass through each of the balancing chambers based on the air humidity measured by the humidity probe by controlling the speed of each fan.

10. The test apparatus according to claim 1, wherein the control system is programmed in a computer operating on the basis of PID (proportional, integral, and derivative)-based software.

\* \* \* \* \*